United States Patent
Nagatani et al.

(10) Patent No.: US 9,720,400 B2
(45) Date of Patent: Aug. 1, 2017

(54) SYNCHRONOUS CONTROL DEVICE

(71) Applicant: MITSUBISHI ELECTRIC CORPORATION, Chiyoda-ku (JP)

(72) Inventors: Tatsuya Nagatani, Chiyoda-ku (JP); Hideaki Minamide, Chiyoda-ku (JP); Tsutomu Yoshikawa, Chiyoda-ku (JP); Kimihiro Mizuno, Chiyoda-ku (JP); Makoto Nishimura, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 267 days.

(21) Appl. No.: 14/760,541

(22) PCT Filed: Sep. 4, 2013

(86) PCT No.: PCT/JP2013/073818
§ 371 (c)(1),
(2) Date: Jul. 13, 2015

(87) PCT Pub. No.: WO2014/119036
PCT Pub. Date: Aug. 7, 2014

(65) Prior Publication Data
US 2015/0355633 A1     Dec. 10, 2015

(30) Foreign Application Priority Data

Feb. 1, 2013  (JP) .................................. 2013-018489
Feb. 1, 2013  (JP) .................................. 2013-018497

(51) Int. Cl.
G05B 19/4155  (2006.01)
(52) U.S. Cl.
CPC ................... *G05B 19/4155* (2013.01); *G05B 2219/50234* (2013.01)

(58) Field of Classification Search
CPC ................................................. G05B 19/4155
(Continued)

(56) References Cited

U.S. PATENT DOCUMENTS 6,388,416 B1 *  5/2002  Nakatani ................. H02P 6/085
                                                                318/700
7,096,076 B2     8/2006  Weinhofer et al.
(Continued)

FOREIGN PATENT DOCUMENTS

JP    2001-306150 A    11/2001
JP    2003-131740 A     5/2003
(Continued)

OTHER PUBLICATIONS

Korean Office Action issued Sep. 13, 2016 in Patent Application No. 10-2015-7020731 (with Partial English translation).
(Continued)

*Primary Examiner* — David S Luo
(74) *Attorney, Agent, or Firm* — Oblon, McClelland, Maier & Neustadt, L.L.P.

(57) ABSTRACT

When change amount information calculated by a change amount information calculating unit satisfies a start condition and a signal condition is true for an operation instruction the start condition and the signal condition of which are defined, an operation instruction execution control unit determines a start of the corresponding operation instruction and determines operation completion based on a completion condition determined in advance of the operation instruction. An operation instruction executing unit executes the operation instruction the start of which is determined by the operation instruction execution control unit and stops the operation instruction when the operation completion is determined by the operation instruction execution control unit.

20 Claims, 9 Drawing Sheets

(58) Field of Classification Search
USPC .................................................. 318/437, 34
See application file for complete search history.

(56) References Cited

U.S. PATENT DOCUMENTS

| | | |
|---|---|---|
| 7,099,719 B2 | 8/2006 | Weinhofer et al. |
| 7,519,440 B2 | 4/2009 | Weinhofer et al. |
| 7,738,977 B2 | 6/2010 | Weinhofer et al. |
| 2006/0197484 A1 | 9/2006 | Ohashi et al. |

FOREIGN PATENT DOCUMENTS

| | | |
|---|---|---|
| JP | 2006-178832 A | 7/2006 |
| JP | 2006-230150 A | 8/2006 |
| JP | 2009-282625 A | 12/2009 |
| JP | 2012-194664 A | 10/2012 |

OTHER PUBLICATIONS

International Search Report issued Oct. 1, 2013 in PCT/JP2013/073818 filed Sep. 4, 2013.

* cited by examiner

FIG.6
| Operation Number | Angle Condition | Signal Condition | Operation Instruction Type | Operation Instruction Detail |
|---|---|---|---|---|
| 1 | = 0 | — | Cam | Cam 1 |
| 2 | = 90 | — | Positioning | Servo 1 |
| 3 | <180 | Operation Completion CPU 1. Shaft 1. No. 2 | Time Wait | 2sec |
| 4 | <270 | Operation Completion CPU 1. Shaft 1. No. 3 | Positioning | Servo 2 |
FIG.7
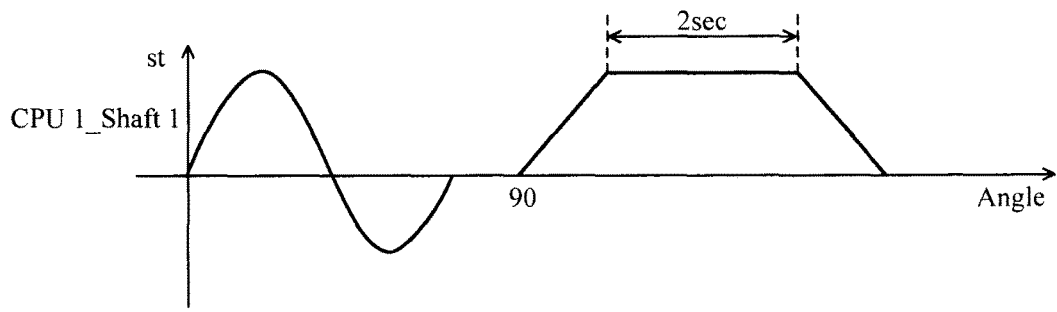
FIG.8
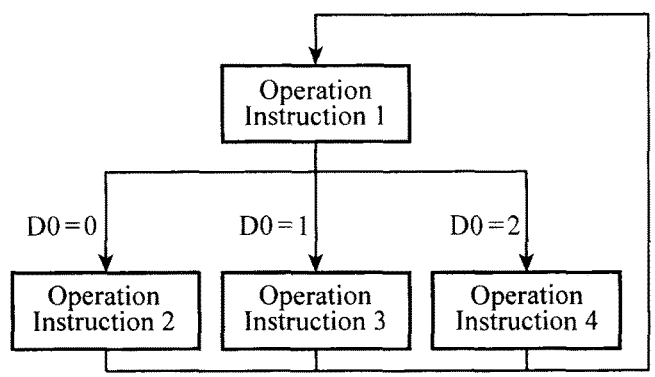

| Operation Number | Angle Condition | Signal Condition | Operation Instruction Type | Operation Instruction Detail | Grouping |
|---|---|---|---|---|---|
| 1 | = 0 | — | Cam | Cam 1 | — |
| 2 | — | D0 = 0 | Positioning | Servo 1 | Start Grouping |
| 3 | — | D0 = 1 | Positioning | Servo 2 | During Grouping |
| 4 | — | D0 = 2 | Positioning | Servo 3 | Finish Grouping |

| Operation Number | Angle Condition | Signal Condition | Device | Instruction |
|---|---|---|---|---|
| 1 | = 0 | — | Y0 | ON |
| 2 | = 90 | — | Y0 | OFF |
| 3 | = 90 | — | D0 | 500 |
| 4 | = 120 | M1 = ON | D1 | 1000 |

SYNCHRONOUS CONTROL DEVICE

TECHNICAL FIELD

The present invention relates to a synchronous control device which performs synchronous control in an industrial machine and a manufacturing device each having a driving device, and an industrial controller that controls a manufacturing line.

BACKGROUND ART

Conventionally, as the synchronous control of a servo motor, electronic cam control which realizes synchronization by using cam data which realizes one-to-one association between a phase of a master encoder attached to a master shaft which determines timing of the synchronous control and a position of a slave shaft is widely known. There is an operation instruction in which a trajectory is defined by speed and/or acceleration, time, etc. like a so-called positioning instruction, and control to activate the operation instruction by a signal input or the like is also widely known.

Conventionally, technology to easily perform the synchronous control including a repeat by dividing the cam data into sections and calling the sections in arbitrary order and in arbitrary number of times is known in the electronic cam control (for example, refer to Patent Document 1).

In addition, control to shift cam operation based on a signal when operation of an auxiliary machine is finished for performing synchronous control with the operation of the auxiliary machine operation time of which is inconstant is known in the electronic cam control (for example, refer to Patent Document 2).

CITATION LIST

Patent Documents

Patent Document 1: JP 2003-131740 A
Patent Document 2: JP 2009-282625 A

SUMMARY OF THE INVENTION

Problems to be Solved by the Invention

However, the technology disclosed in Patent Document 1 is to activate the cam operation by specifying a start angle, for example, and the operation which can be realized is the same as that of the conventional electronic cam control in which a positional relationship between the master shaft and the slave shaft is always the same. That is to say, there is a problem that control to synchronize with timing of operation completion of the operation instruction the trajectory of which is defined by the speed and/or acceleration, time, etc. and timing of change of external and/or internal signals cannot be realized.

In addition, the technology of Patent Document 2 executes the cam control by adding a shift amount to a reference shaft based on an actual signal input, and there is a problem that control obtained by combining the operation instructions the trajectory each of which is defined by the speed and/or acceleration, time, etc. cannot be mixed. Further, in a case of the control to add the shift amount to the reference shaft, especially the control with different shift amounts depending on the shafts, there is a problem that it is difficult to grasp the entire operation and each shift amount at the time of programming and operation monitoring, so that it takes time for the adjustment.

The present invention is made to solve the above-described problems, and an object thereof is to obtain a synchronous control device capable of improving work efficiency of the device having a driving device and of shortening starting-up and adjusting time.

Means for Solving the Problems

According to a synchronous control device of the present invention, there is provided the synchronous control device that makes a change in an angle of a master shaft or time elapsed from reference time change amount information and controls execution of an operation instruction of a slave shaft in synchronization with the change amount information, and the synchronous control device includes as a controller: a change amount information calculator that calculates the change amount information; an operation instruction execution controller that, when a start condition indicating an angle condition of the master shaft or a time condition from the reference time and a predetermined signal condition are defined for the operation instruction of the slave shaft and when the change amount information satisfies the start condition and the signal condition is true, determines a start of a corresponding operation instruction, and determines operation completion based on a completion condition determined in advance of the operation instruction; and an operation instruction executor that executes the operation instruction the start of which is determined by the operation instruction execution controller and stops the operation instruction when the operation completion is determined by the operation instruction executioncontroller.

Effect of the Invention

When the start condition indicating the angle condition of the master shaft or the time condition from the reference time and the predetermined signal condition are defined for the operation instruction of the slave shaft and when the change amount information satisfies the start condition and the signal condition is true, the synchronous control device of the invention is configured to determine the start of the corresponding operation instruction and determine the operation completion based on the completion condition determined in advance of the operation instruction, so that it is possible to improve the work efficiency of the device including the driving device and shorten starting-up and adjusting times.

BRIEF DESCRIPTION OF THE DRAWINGS

FIG. 6 is an illustrative diagram illustrating an example of an operation timing table in a synchronous control device of a second embodiment of the invention.

FIG. 7 is an illustrative diagram illustrating an example of an operation trajectory realized in the synchronous control device of the second embodiment of the invention.

FIG. 8 is an illustrative diagram illustrating condition branching in a synchronous control device of a fifth embodiment of the invention.

MODES FOR CARRYING OUT THE INVENTION

An embodiment for carrying out the invention is hereinafter described with reference to the attached drawings in order to describe the invention in more detail.

First Embodiment

The present invention is configured to realize flexible execution of synchronous control of a servo shaft by executing an operation instruction of the servo shaft in synchronization with an angle of a master shaft, completion of the operation instruction, and a change in external and/or internal signals; an outline thereof is first described.

Figure 1:
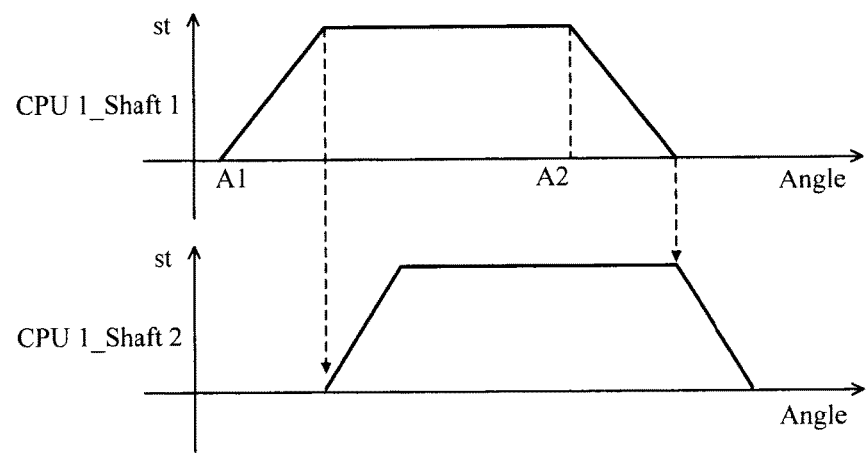
FIG. 1 is an illustrative diagram illustrating synchronous control of two shafts.

FIG. 1 is an illustrative diagram illustrating the synchronous control of two shafts. The angle (Angle) of the master shaft and a stroke (st) of each shaft are plotted along a horizontal axis and a vertical axis, respectively. An entire operation is such that a shaft 1 first starts operating when the angle of the master shaft is A1 and a shaft 2 starts operating after the operation of the shaft 1 is completed. Thereafter, the shaft 1 starts operating when the angle of the master shaft is A2 and the shaft 2 starts operating after the operation of the shaft 1 is completed. That is to say, the operation is such that the shaft 1 starts operating at specific timing linked with the master shaft and the shaft 2 starts operating after the operation is completed. For example, this is the operation in which the shaft 2 retracts after the shaft 1 cramps work. In FIG. 1, acceleration/deceleration is omitted for simplification.

Conventionally, in the case of performing the above control, it has been realized by creating cam data as depicted in FIG. 1 for each shaft to perform cam control. Since a cam curve at this time is the data of one round of the master shaft, a worker creates the cam data of the shaft 2 by calculating the angle at which the operation of the shaft 1 is completed. On this occasion, it is required to assume a speed of an entire device in advance to create the cam data with which an excessive load is not applied to a motor based on speed and/or acceleration performances of the motor. It is required to revise the cam data when an operational speed of the entire device is increased in order to improve work efficiency of the device.

Therefore, the present invention executes control in which the shaft 1 executes a positioning instruction at the angles A1 and A2 and the shaft 2 executes the positioning instruction at the timing at which a corresponding positioning instruction of the shaft 1 is completed. The positioning instruction is the instruction to specify the speed and/or acceleration, so that it is possible to realize easily the operation which sufficiently exerts the performance of the motor, independently of the operational speed of the entire device. That is to say, it is possible to realize the operation which sufficiently exerts the performance of the motor while maintaining the synchronization such that the shaft 1 starts operating at a specific angle of the master shaft and that the shaft 2 starts operating after the operation of the shaft 1 is completed without changing a program even when the operational speed of the entire device is increased.

Figure 2:
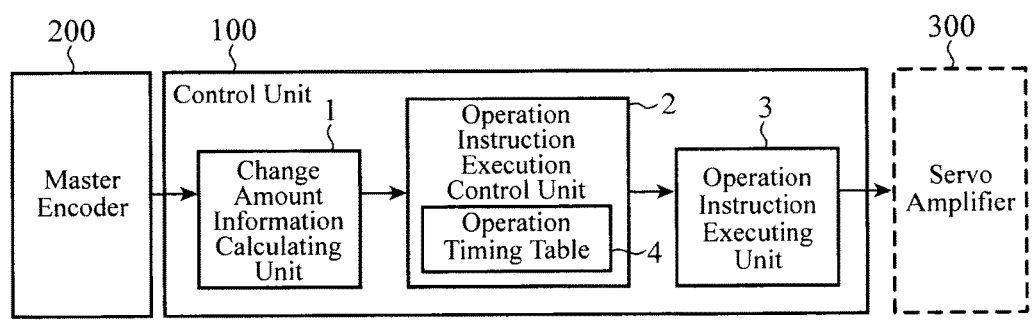
FIG. 2 is a configuration diagram illustrating a synchronous control device according to a first embodiment of the invention.

FIG. 2 is a configuration diagram illustrating a synchronous control device of the first embodiment.

As illustrated, the synchronous control device is provided with a control unit 100 including a change amount information calculating unit 1, an operation instruction execution control unit 2, and an operation instruction executing unit 3. The change amount information calculating unit 1 is an arithmetic unit which calculates the angle of the master shaft used as the synchronous control device based on a signal from a master encoder 200 which detects the angle of the master shaft as change amount information. That is to say, the change amount information calculating unit 1 performs a process including compensations of delay in communication from the master encoder 200 to the control unit 100, and delay in communication and/or control from the control unit 100 to a shaft end being a control target, and these compensations each are a process of calculating the angle of the master shaft which should be assumed in a current control cycle from known delay time and a rotational speed of the master shaft. Meanwhile, these processes each are a known technology, and detailed descriptions thereof will be omitted herein.

The operation instruction execution control unit 2 is a processing unit which, when the angle of the master shaft satisfies an angle condition defined by the operation instruction and also a signal condition is true, determines a start of the corresponding operation instruction, and further determines operation completion based on a completion condition determined in advance of the operation instruction. An operation timing table 4 held in the operation instruction execution control unit 2 will be described in a second embodiment. Meanwhile, although the operation timing table 4 is provided in the operation instruction execution control unit 2 in an illustrated example, it may also be provided outside the operation instruction execution control unit 2.

The operation instruction executing unit 3 is an executing unit of the operation instruction which executes the operation instruction the start of which is determined by the operation instruction execution control unit 2, and also stop the operation instruction when the operation completion is determined by the operation instruction execution control unit 2, and outputs a command value thereof to a servo amplifier 300 which controls the servo shaft being a control target.

Figure 3:
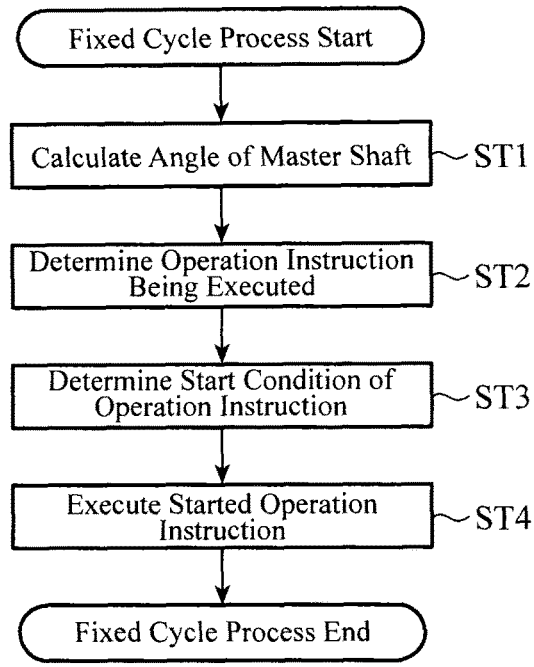
FIG. 3 is a flowchart illustrating shaft control executed at a constant frequency in the synchronous control device of the first embodiment of the invention.

Next, an operation of the synchronous control device of the first embodiment is described with reference to a flowchart in FIG. 3. FIG. 3 is a flowchart illustrating shaft control executed at a constant frequency.

First, the change amount information calculating unit 1 executes angle calculation of the master shaft (step ST1). As mentioned above, the process includes the compensations of the delay in communication from the master encoder 200 to the control unit 100 and/or the delay in the communication and control from the control unit 100 to the shaft end, and these compensation are performed by calculation of the angle of the master shaft which should be assumed in a current control cycle from a known delay time and the rotational speed of the master shaft.

Next, the operation instruction execution control unit 2 calculates the command value to the servo amplifier 300 by processing the operation instruction being currently executed of each shaft, that is to say, the operation instruction started before a current fixed cycle process and not finished yet (step ST2). The completion of the operation instruction being executed also is determined at step ST2. When the operation instruction is not being executed, no process is particularly executed.

Next, the operation instruction execution control unit 2 determines a start condition of the operation instruction in each shaft in a state in which an operation instruction start may be accepted (step ST3). The start condition includes the angle condition and the signal condition, for example, and when both conditions are true, execution of the corresponding operation instruction is started. The operation instruction executing unit 3 processes the operation instruction the execution of which is determined to be started at step ST3 and calculates the command value to the servo amplifier 300 (step ST4). The command value at that time overwrites the command value at step ST2.

At step ST2 described above, the operation completion is determined when a command to a position in which the operation instruction is completed is generated. Specifically, in a case of the instruction in which an output is determined corresponding to the angle of the master shaft such as the cam control, when the angle of the master shaft calculated at step ST1 reaches an end of the cam data, the command value is generated by the cam data of the end and the operation completion is determined. Also in the instruction in which the operation instruction is completed when the command value of the instruction is compared with an encoder value to be sufficiently smaller, like the positioning instruction, the operation is completed when the command value corresponding to the end of the instruction is output without comparing the same with the encoder value. This is because the control unit 100 executes the entire control based on an angle ahead of angle information of the master shaft input to the control unit 100 for compensating the delay in communication at step ST1, so that wait time of the delay in communication is generated in the comparison with the encoder value, resulting in a factor to inhibit improvement in operational speed of the device.

At step ST3, the angle condition is represented by a comparison equation between the angle of the master shaft calculated at step ST1 and a constant or a variable. Common operators such as "=", "<", "≤", ">", and "≥" are used as comparative operators, for example. Herein, "=" is not used for determining that both sides of an equation are equal to each other; it is determined as true in a cycle in which the angle of the master shaft calculated at step ST1 reaches the constant or variable to be compared for the first time. For example, when the angle of the master shaft is represented as "Angle" and the comparison equation of the angle condition satisfies "Angle=100", if an angle calculation result of the master shaft at step ST1 in a previous processing cycle is 98, and the angle calculation result of the master shaft at step ST1 in a current processing cycle is 101, the comparison equation "Angle=100" of the angle condition is determined as true in the current processing cycle. Inequalities other than this are the same as "smaller than", "not larger than", "larger than", and "not smaller than" commonly used and it is determined by comparison of the constant or variable with the angle calculation result of the master shaft at step ST1. It is also possible to set a condition equation by using a plurality of inequalities for setting a range.

At step ST3, the signal condition is represented by a comparison equation between a value of an internal memory of the control unit 100 and a constant or a variable. Herein, the value of the internal memory includes a signal state not only from an internal device such as a device which represents by two values of ON and OFF, a device capable of handling a numerical value and a character string, and a timer, but also from an external input device such as a switch and a sensor. The common operators such as "=", "<", "≤", ">", and "≥" are used as comparative operators, for example. The signal condition may also be represented by a logic sum and a logic product of a plurality of comparison equations. It is also possible to specify timing at which a specified operation instruction of a specified shaft is completed as the signal condition.

The angle condition and the signal condition may be omitted at step ST3, and in this case, the corresponding conditions are considered to be true.

As in existing cam control, a length of one round of the master shaft is set; when the master shaft keeps rotating over one round, the angle of the master shaft returns to 0 degree and the control is cyclically executed.

Figure 4:
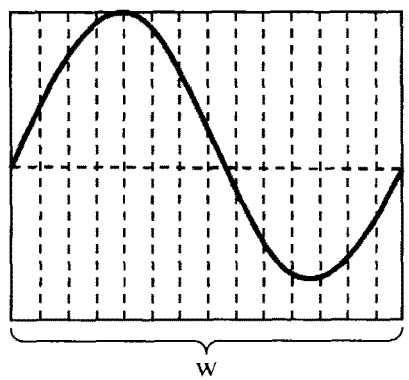
FIG. 4 is an illustrative diagram illustrating an example of cam data in the synchronous control device of the first embodiment of the invention.
Figure 5:
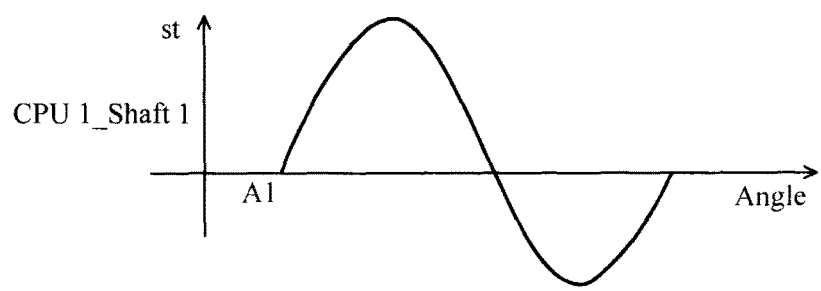
FIG. 5 is an illustrative diagram illustrating an operation of a cam instruction in the synchronous control device of the first embodiment of the invention.

The operation instruction to be executed is a cam instruction, the positioning instruction and/or the like. In the cam instruction of the present invention, a cam length of the cam data is not the same as that of one round of the master shaft, and when the operation corresponding to the cam length is just executed, the corresponding operation instruction is completed. For example, when there is cam data C1 having the cam length of w as illustrated in FIG. 4 and when the cam instruction controlled by the cam data C1 is executed when the angle of the master shaft is A1 as illustrated in FIG. 5, the corresponding cam instruction is executed until the angle of the master shaft passes A1+w and the corresponding operation instruction is completed when the angle of the master shaft is A1+w.

When it is desired to realize the operation instruction to trace an operation trajectory linked with the speed of the master shaft, for example, when it is desired to perform operation following the work moving along a conveyor or when it is desired to realize synchronous operation with the shaft operated by the cam control, the cam instruction may be executed. In contrast, when it is desired to match only start timing of the operation or it is desired to operate for a fixed time at a constant speed independently of the speed of the master shaft in relation to another device, or when it is desired to operate as fast as possible, the positioning instruction may be executed. When it is desired to maintain a position of the shaft for a specified time, for example, when the operation completion of an external device is waited, it is possible to execute a time wait instruction and execute an appropriate move instruction at the timing at which the corresponding time wait instruction is completed.

It is also possible to describe the change amount information by a time condition in place of the angle condition. In this case, time of a master station becomes a reference in place of the angle of the master shaft; a length of one period is set also in this master center and the control is cyclically executed. A speed at which reference time advances may be freely changed in a system like the change in the rotational speed of the master shaft.

In this manner, in the first embodiment, flexible synchronous control to execute various operation instructions of the servo shaft with operation timing synchronized with the master shaft becomes possible by activation of the operation instruction of the servo shaft such as the cam instruction, the positioning instruction, and the time wait instruction based on the angle condition of the master shaft and the signal condition of the internal memory of the control unit 100. By virtue of this control, time to wait for processing of an interlocking signal for synchronizing the operation timing and completion of the positioning of the servo shaft which is conventionally required may be reduced, and there is an effect of improving the operational speed of the device. When the operational speed of the device is also increased, adjustment of the cam data may be reduced and there is an effect that can shorten the adjusting time.

As described above, according to the synchronous control device of the first embodiment, there is provided the synchronous control device which makes the change in the angle of the master shaft or time elapsed from reference time the change amount information and controls the execution of the operation instruction in synchronization with the change amount information, the synchronous control device including as the control unit: the change amount information calculating unit which calculates the change amount information; the operation instruction execution control unit which, when the start condition indicating the angle condition of the master shaft or the time condition from the reference time and a predetermined signal condition are defined for the operation instruction, and when the change amount information satisfies the start condition and the signal condition is true, determines the start of the corresponding operation instruction, and determines the operation completion based on the completion condition determined in advance of the operation instruction; and the operation instruction executing unit which executes the operation instruction the start of which is determined by the operation instruction execution control unit and stops the operation instruction when the operation completion is determined by the operation instruction execution control unit, to thereby improve the work efficiency of the device including a driving device and shorten starting-up and adjusting times thereof.

Second Embodiment

A second embodiment describes an example of a data structure and a processing method suitable for realizing the control of a first embodiment. In the second embodiment, an operation timing table 4 in which operation instructions are stored in an order of execution for each shaft held in an operation instruction execution control unit 2 is described.

FIG. 6 illustrates an example of the operation timing table of a shaft 1 of a control unit 100 (CPU 1) and FIG. 7 illustrates an example of an operation trajectory to be realized. Cam operation of cam data 1 is executed at an angle of 0 degree and a positioning instruction of a servo 1 is executed at an angle of 90 degrees. The positioning instruction of a servo 2 is executed after a position of the shaft is maintained for two seconds after the positioning instruction of the servo 1 is completed.

In order to simplify the description, it is configured that the operation of the shaft 1 is started with the operation timing table 4 in FIG. 6 from a first processing cycle in which an angle of a master shaft calculated at step ST1 in FIG. 3 reaches 0 degree. Since an operation instruction is not being executed during the first processing cycle, there is no process at step ST2. Subsequently, a start condition of the operation instruction of an operation number 1 is determined at step ST3. Herein, since both an angle condition and a signal condition are satisfied, the operation instruction of the operation number 1 is activated. Finally, a command value is generated based on the cam data 1 at step ST4. If the cam data is defined by an address and a stroke, an angle advanced from the angle at which the cam instruction is started (in this case, 0 degree) to the angle of the master shaft calculated at step ST1 is calculated and the stroke is derived from the cam data by using the calculated one as the address to be thus determined as the command value.

When a cam length of the cam data 1 is set to w, the command value based on the cam data 1 is generated at step ST2 in the process until the angle calculated at step ST1 becomes larger than w and it is not in a state in which a next operation instruction can be accepted, so that no process is performed at steps ST3 and ST4.

In the first processing cycle in which the angle calculated at step ST1 becomes larger than w, a process of operation completion is executed at step ST2 and it shifts to the state in which the next operation instruction can be accepted. Subsequently, the start condition of the operation instruction of an operation number 2 being a next operation instruction in the operation timing table is determined at step ST3. Suppose that it is herein set as w<90, it is determined as false in this processing cycle, so that the operation instruction is not executed. The angle of the master shaft calculated in a current processing cycle is not larger than the angle condition of the operation number 2, so that it does not shift to the determination of the start condition of the next operation instruction and step ST3 is finished. Since the operation instruction is not started, no process is performed at step ST4.

In the process until the angle calculated at step ST1 becomes larger than 90 degrees being the angle condition of the operation number 2, no process is performed at step ST2, the start condition of the operation number 2 is determined as false at step ST3, and no process is performed at step ST4.

In the first process in which the angle calculated at step ST1 reaches 90 degrees being the angle condition of the operation number 2, the start condition of the operation number 2 is determined as true and the operation instruction is activated at step ST3. At step ST4, the positioning instruction based on the servo 1 is processed and the command value is generated.

Until the completion of the positioning instruction of the operation number 2 is determined at step ST2, the command value is generated at step ST2 and it is not in the state in which the next operation instruction can be accepted, so that no process is performed at steps ST3 and ST4.

In the processing cycle in which the completion of the positioning instruction of the operation number 2 is determined at step ST2, the start condition of the operation instruction of an operation number 3 being a next operation instruction in the operation timing table 4 is determined at step ST3. When the angle of the master shaft calculated at step ST1 is smaller than 180 degrees, the angle condition is true and the operation instruction of the operation number 2 of the shaft 1 of the CPU 1 being the signal condition is completed, so that the start condition of the operation number 3 is true and the operation instruction is executed. The command value is generated based on the instruction to maintain the position of the shaft for two seconds at step ST4. As in the above-described process, until the operation instruction 3 is completed, the command value is generated at step ST2 and no process is performed at steps ST3 and ST4.

In the processing cycle in which completion of a time wait instruction of the operation number 3 is determined at step ST2, the start condition of the operation instruction of an operation number 4 being a next operation instruction in the operation timing table is determined at step ST3. When the angle of the master shaft calculated at step ST1 is smaller than 270 degrees, the angle condition is true and the operation instruction of the operation number 3 of the shaft 1 of the CPU 1 being the signal condition is completed, so that the start condition of the operation number 4 is true and the operation instruction is executed. At step ST4, the positioning instruction based on the servo 2 is processed and the command value is generated. As in the above description, the command value is generated at step ST2 until the operation instruction 4 is completed and no process is performed at steps ST3 and ST4.

Finally, in the processing cycle in which completion of the positioning instruction of the operation number 4 is determined at step ST2, since only the numbers up to the operation number 4 are defined in the operation timing table, it returns to the operation instruction of the operation number 1 being the first operation instruction to determine the start condition at step ST3.

Hereinafter, the operation instructions are executed along with one round of the master shaft.

Herein, if the processing cycle in which it shifts to the start condition determination of the operation number 2 passes over the processing cycle in which the angle of the master shaft becomes larger than 90 degrees for the first time, it is possible to shift to the next operation number without executing the operation or execute the operation after outputting a warning.

Also, in the processing cycle in which it shifts to the start condition determination of the operation numbers 3 and 4, if the angles of the master shaft are larger than 180 and 270 degrees, respectively, it is possible to shift to the next operation number without executing the operation or execute the operation after outputting the warning.

Although the operation completions are specified and described in the respective signal conditions in the operation numbers 3 and 4 in FIG. 6, similar control may be performed by a method of describing in which the signal condition is not specified (always true). If the warning when the operation start delays or non-execution of the operation instruction are ignored, the similar control may be performed by the method of describing in which the angle conditions are not specified (always true) as for the operation numbers 3 and 4.

As described above, according to the synchronous control device of the second embodiment, there is provided with the operation timing table in which the start conditions and the operation instructions of one round of the master shaft or one period from reference time are arranged in the order of execution, wherein the operation instruction execution control unit shifts to the determination of the operation instruction to be executed next when any operation instruction is executed or when the change amount information passes the value of the start condition and shifts to the determination of the first operation instruction in the execution order of the operation timing table when passing of the last operation instruction in the execution order of the operation timing table; thus, the operation instructions of each shaft are executed in the order described in the operation timing table, which eliminates the need to describe and process unnecessary condition determination, and there is an effect of simplifying the program description and reducing the processing load.

Third Embodiment

In consideration of synchronous control in equipment using a plurality of control units 100, delay in communication occurs when a memory managed by another control unit 100 is referred to. In contrast, in control synchronized with a master shaft, a command is generated ahead of an input signal to the control unit 100 for compensation of the delay in communication between a master encoder 200 of a master shaft and the control unit 100 and between the control unit 100 and a shaft end. Therefore, if an operation instruction is started with reference to the memory managed by another control unit 100 such as operation completion, there is a problem that the control units are desynchronized by the delay in communication due to memory reference.

Therefore, in a third embodiment, a specific control unit 100 which is referred to calculates an angle of the master shaft at which the operation instruction is completed and another control unit 100 refers to the calculated angle in order to specify operation instruction completion of the specific control unit 100 as operation start timing to synchronize.

That is to say, each control unit which executes the operation instruction calculates the angle of the master shaft at which the operation instruction is completed and another control unit refers to the calculated angle, so that each control unit may start the operation instruction without missing completion timing of the specified operation instruction. By making the uniquely determined angle of the master shaft the operation start timing, the synchronous control in which the operation instruction completion is specified as the start timing of the operation instruction becomes possible also when a plurality of control units is used.

A completion angle is calculated when the operation instruction is started by using an equation "start angle of operation instruction+operation execution angle of operation instruction". The operation execution angle of the operation instruction is a cam length of cam data to be executed in a case of cam instruction. As for a positioning instruction and a time wait instruction, this is calculated by multiplying a rotational speed of the master shaft when the operation is started by execution time of each instruction.

If the operation instruction completion of the specific control unit is made the operation start timing, the completion angle of the corresponding operation instruction calculated by using the above-described equation and data of whether execution of the corresponding operation instruction is started are received from the specific control unit which is referred to, and the operation completion being a signal condition is determined as true at timing at which it passes the corresponding completion angle at step ST3. When the data of execution start is not obtained, the operation completion being the signal condition is false.

In order to synchronize timing with the specific control unit, as for the instruction to operate for constant time such as the time wait instruction and the positioning instruction, the operation instruction may be completed in a processing cycle in which the angle of the master shaft passes the completion angle calculated by using the above-described equation to shift to a next operation instruction.

As described above, according to a synchronous control device of the third embodiment, there is provided with the plurality of control units, and when an arbitrary control unit makes the completion of the operation instruction of the specific control unit different from the same its own signal condition, the specific control unit calculates the completion timing of the operation instruction and the arbitrary control unit determines the start of its own operation instruction based on the completion timing of the operation instruction of the specific control unit; thus, there is an effect of improving synchronizing accuracy between the control units by sharing the completion timings of the positioning instruction and/or time fixed instruction by using change amount information.

Fourth Embodiment

A speed instruction, a torque instruction, a gear instruction and the like may also be added as operation instructions. By the instructions, operation is such that a shaft keeps rotating in one direction until finish timing is specified or a stop instruction is entered.

The speed instruction and the torque instruction are the instructions to control a motor at a specified speed, acceleration, and torque and it operates independently of a speed of the master shaft; the gear instruction is the instruction to allow the shaft to operate at a speed proportional to the speed of the master shaft by specifying a gear ratio with the master shaft. In the gear instruction, it is possible to introduce smoothing operation in order to inhibit excessive acceleration when the operation instruction is started or finished.

Such operation instruction is different from the operation instructions described in the first to third embodiments and a completion condition is not defined when the operation instruction is started, so that the operation instruction is finished by execution of the stop instruction. In these operation instructions, after the operation instruction is started, a next operation instruction is in an acceptable state and an operation start condition of the next operation instruction is determined. For example, the subsequent instruction includes the stop instruction, a command value change instruction, a positioning instruction and the like.

It is also possible to specify the completion condition in the operation instruction. For example, this is a signal input, specified time, a completion angle and the like. When the completion condition is specified, it is not required that the next operation instruction is made in the acceptable state until the completion condition is satisfied also after the operation instruction is started.

As described above, according to asynchronous control device of a fourth embodiment, the operation instruction itself does not have the completion condition and this is stopped by another operation instruction, so that there is an effect of widening a scope of control by coping with the control to keep rotating the motor such as the speed instruction, the torque instruction, and the gear instruction.

Fifth Embodiment

Figures 9, 10, 11:
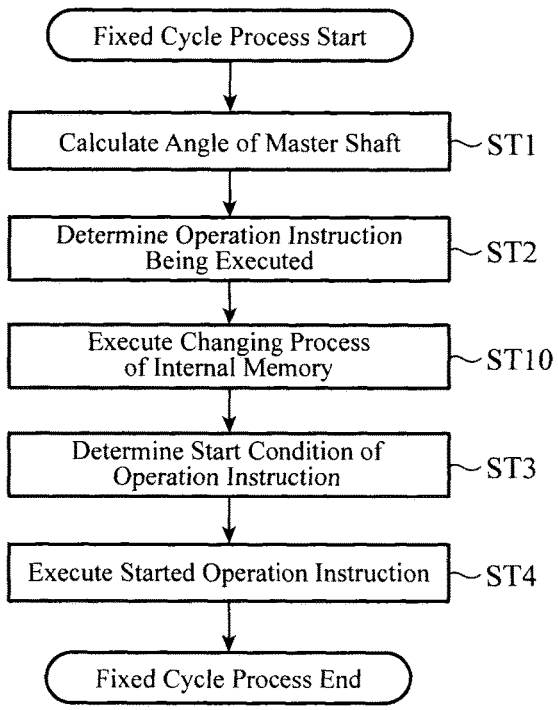
FIG. 9 is an illustrative diagram illustrating an operation timing table in the synchronous control device of the fifth embodiment of the invention.
FIG. 10 is a flowchart illustrating shaft control executed at a constant frequency in a synchronous control device of a seventh embodiment of the invention.
FIG. 11 is an illustrative diagram illustrating an example of an operation timing table in a synchronous control device of an eighth embodiment of the invention.

It is also possible to group operation instructions as illustrated in FIG. 9 in order to realize condition branching to change the operation instruction to be executed according to a value of an internal memory D0 as illustrated in FIG. 8, and this is described next as a fifth embodiment.

In a case of the operation instructions which are not grouped, it shifts to a next operation instruction when execution of the operation instruction is completed or when an angle of a master shaft passes an angle condition of a start condition. In contrast, in a case of the operation instructions which are grouped, when the start condition is not true, the start condition of the next operation instruction in the group is determined. When any operation instruction in the group is executed or when the angle of the master shaft passes all the start conditions in the group, it shifts to a next operation instruction outside the group. Herein, in a case in which there is any start condition in the group which the angle of the master shaft does not pass, when signal conditions of all the operation instructions are false and none of the operation instructions in the group is executed, the operation instruction in this group is determined also in a next processing cycle.

For example, when an operation timing table 4 as illustrated in FIG. 9 is set, an operation instruction 1 described in an operation number 1 is executed when an angle of a master encoder is 0 degree, and any one of operation instructions 2, 3, and 4 described in operation numbers 2, 3, and 4, respectively, is executed according to the value of D0 just after the execution of the operation instruction 1 is completed or none of them is executed because the signal condition is false. When the execution of any instruction is completed or when the signal condition is false, it shifts to determination of the start condition of the operation instruction 1. If neither the angle condition nor the signal condition are described, it is executed considering that they are always true. When the angle condition is not described, operation start determination of the corresponding operation instruction is executed only once. Furthermore, when the signal condition is false, it shifts to the next operation instruction without starting the operation instruction.

Meanwhile, although it is simply illustrated "start grouping", "during grouping", and "finish grouping" in FIG. 9, it is also possible to enable complicated condition branching by assigning a number to each group or making a nesting structure thereof.

As described above, according to a synchronous control device of the fifth embodiment, arbitrary operation instructions are grouped and, when any operation instruction in the group satisfies the condition, an operation instruction execution control unit determines the start of the operation instruction satisfying the condition, so that the conditional branching of the operation instructions to be executed becomes possible and there is an effect of widening a scope of the control.

Sixth Embodiment

It is also possible to add a change in an operation timing table 4 and/or a change in an operation number as an operation instruction. If it is desired to significantly change the operation instruction to be executed due to a defect of a device, a change in a product to be manufactured, and/or the like, it is changed to a specified operation timing table 4. Alternatively, this is used when it is desired to change operation order by specifying the operation number to be executed next.

By configuring in this manner, the instruction is executed when a start condition is true as in other operation instructions to thus change to the specified operation timing table 4 or change to the specified operation number.

As described above, according to a synchronous control device of a sixth embodiment, the operation instruction includes the change to another operation timing table or the change in execution order of the operation instructions in a current operation timing table, so that there is an effect of widening a scope of control logic.

Seventh Embodiment

It is also possible to describe a change in an output device and/or a value of an internal memory in an operation timing table 4. The output device and/or the internal memory the change of which is wanted to be executed are selected in synchronization with an angle of a master shaft, operation completion of a shaft, and/or the like are selected to create the operation timing table 4. Description of a start condition is the same as that of a servo shaft. An instruction to be executed is ON/OFF of the device, a pulse output, the change in the value of the memory.

FIG. 10 is a flowchart of a process. A changing process of the internal memory (including the changing process of the output device) at step ST10 is executed before start condition determination of the operation instruction in addition to processes of the servo shaft. The processes at other steps ST1 to ST4 are similar to those in FIG. 3, so that description thereof is herein omitted.

As described above, according to a synchronous control device of a seventh embodiment, since the operation timing table includes the change in the output device being a target of synchronous control or the value of the internal memory being the value used when the synchronous control is executed, it is possible to perform the changing process of the output device and/or the value of the internal memory in synchronization with the angle of the master shaft and/or the operation completion of the servo shaft, so that there is an effect of enabling the synchronous control including an external device and/or an internal process.

Eighth Embodiment

It is also possible to collectively describe change instructions of an output device and a value of an internal memory timing of which is defined by an angle of a master shaft in a table collectively without dividing them into each device and memory, and this is described next as an eighth embodiment.

FIG. 11 is an example of an operation timing table 4 in which device instructions are collected of the eighth embodiment. As illustrated, operation instructions are arranged in ascending order of angle conditions. A signal condition is similar to that in the above-described embodiments. "Device" specifies the device to be changed and "instruction" specifies contents of the change.

An operation instruction execution control unit 2 determines a condition of only an operation instruction corresponding to the angle from the angle of the master shaft in a previous processing cycle to the angle of the master shaft in a current processing cycle to execute the instruction by using the operation timing table 4 configured in this manner.

As described above, according to a synchronous control device of the eighth embodiment, the change instructions of the output device or the value of the internal memory are held in the one operation timing table, so that it is possible to minimize the number of operation instructions a process of which is executed by determining the condition of only the operation instruction corresponding to the angle from the angle of the master shaft in the previous processing cycle to the angle of the master shaft in the current processing cycle, and there is an effect of reducing a processing load.

Ninth Embodiment

Data input and operation confirmation may also be realized by an editor (graphical editing unit) which graphically represents the same and this is described next as a ninth embodiment.

Figure 12:
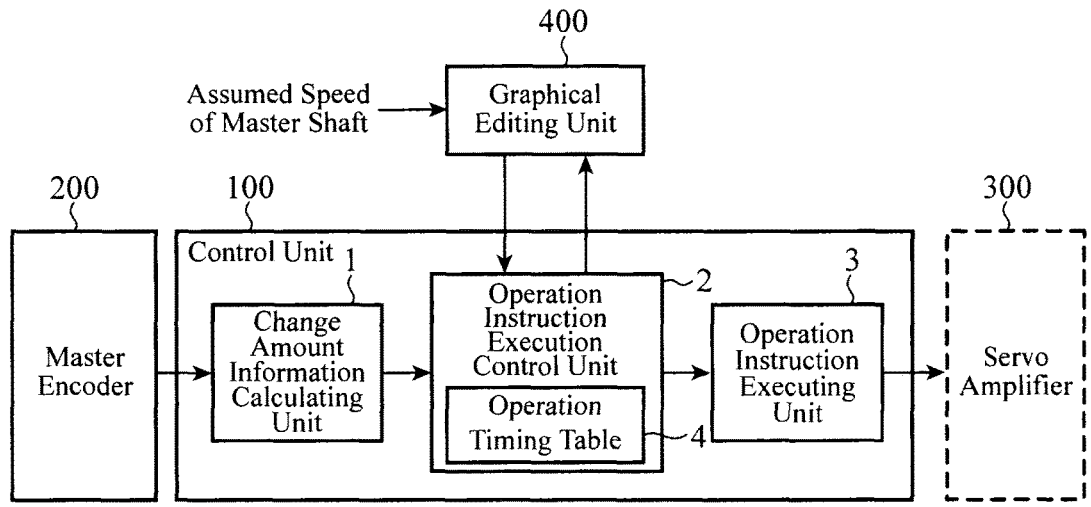
FIG. 12 is a configuration diagram illustrating a synchronous control device according to a ninth embodiment of the invention.

FIG. 12 is a configuration diagram of a synchronous control device of the ninth embodiment in which a graphical editing unit 400 being the editor is added to a configuration of a synchronous control device illustrated in FIG. 2. The graphical editing unit 900 has a function to graphically display an execution control state of an operation instruction execution control unit 2 and accept an edit input of an operation instruction or a change in a value of an internal memory to displayed contents.

Figure 13:
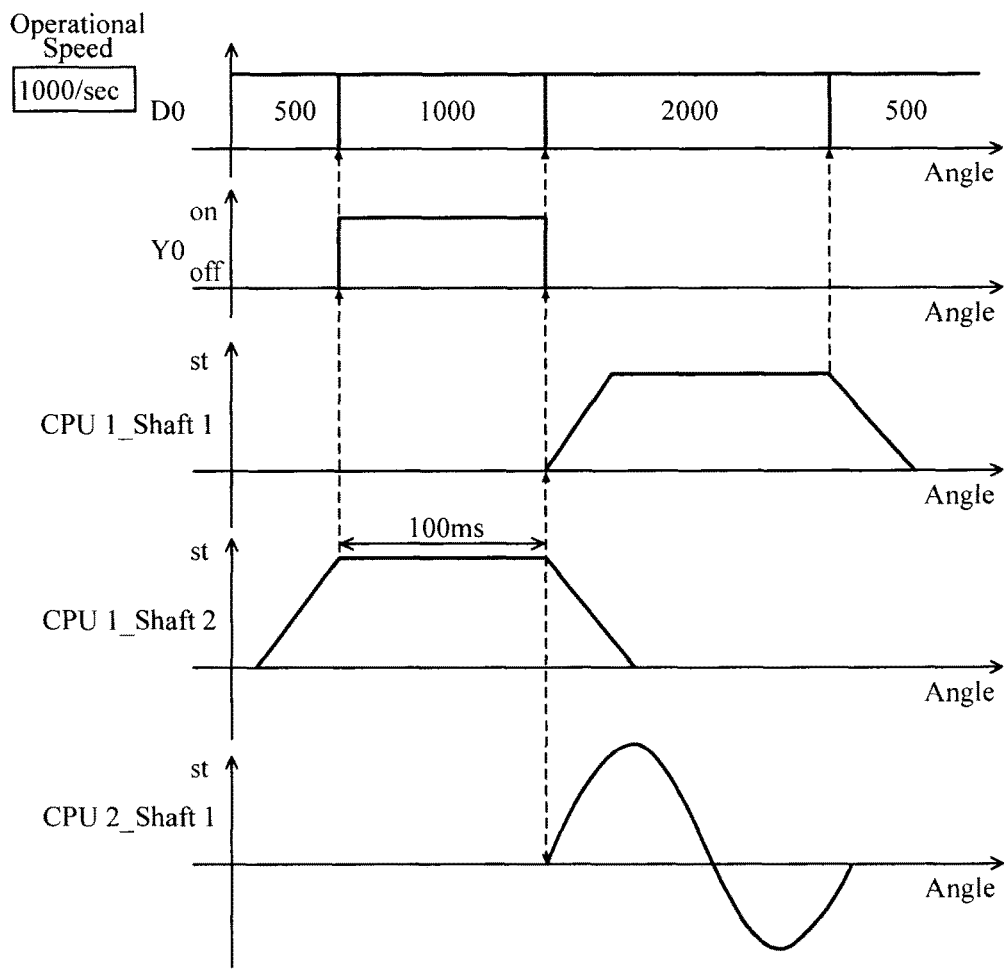
FIG. 13 is an illustrative diagram illustrating a display image of a graphical editing unit in the synchronous control device of the ninth embodiment of the invention.

FIG. 13 is an illustrative diagram illustrating a displayed image of the graphical editing unit 400. An angle of one round of a master shaft is plotted along a horizontal axis and each graph represents a position of a servo shaft, ON/OFF of a device, and a stored value.

The graphical editing unit 400 inputs an assumed speed of the master shaft being an operational speed of an entire device. In FIG. 13, this is represented as the operational speed. States of the servo shaft and the device are displayed based on the input operational speed and an operation timing table 4.

A position of the servo shaft according to the angle of the master shaft is displayed. A color and a line type are changed according to an instruction execution state of each shaft. The states are represented so as to be visually distinguished including a type of the instruction during execution; for example, a state in which instruction execution is waited is indicated in gray, a state in which cam operation is performed is indicated in black, a state in which a positioning instruction is performed is indicated in green, and a state in which a time wait instruction is performed is indicated in orange. As for the instruction, operation start timing of which is operation instruction completion, a corresponding relationship thereof is indicated by a line segment such as an arrow such that this is visually recognized.

A state of the device which takes two values such as ON and OFF is also graphically represented along Y0 axis in FIG. 13. As for a state of the device which holds a value such as an integral value, a stored value is represented along D0 axis in FIG. 13.

The graphical editing unit 400 not only confirms but may also adjust a created program. For example, there are a function to make an angle condition changeable by performing drag-and-drop operation of a line segment in which the instruction is described by means of a mouse, a function to call an edit screen of the corresponding instruction by selecting the line segment in which the instruction is described, a function to add various instructions by specifying a position on the screen, and a function to select two instructions, thereby making an operation start condition of the one instruction an operation completion condition of the other. In any function, representation is automatically updated when the program is changed.

As described above, according to the synchronous control device of the ninth embodiment, there is provided the synchronous control device which makes the change in the angle of a master shaft or time elapsed from reference time the change amount information and controls the execution of the operation instruction in synchronization with the change amount information, the synchronous control device including: the operation instruction execution control unit which checks the change amount information and a predetermined signal value of its own holding against an instruction execution condition provided corresponding to the operation instruction or a change execution condition of the value of the internal memory indicating a value of an arbitrary device used in control and controls to execute the operation instruction or the change in the value of the internal memory when they satisfy the instruction execution condition or the change execution condition; and the graphical editing unit which graphically displays the execution control state of the operation instruction execution control unit and accepts the edit input of the operation instruction or the change in the value of the internal memory to the displayed contents; thus, when the states of the shaft and/or device are represented graphically, a synchronous state can be easily understood, and further the editing can be performed on the graphic, and there is an effect of facilitating the adjusting and/or editing for the program.

Tenth Embodiment

Figure 14:
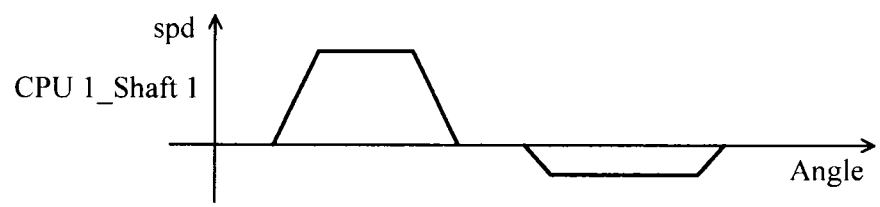
FIG. 14 is an illustrative diagram of a case in which an operation of a shaft is represented by a speed in a synchronous control device of a tenth embodiment of the invention.

An instruction to keep rotating a motor in one direction such as a speed instruction, a torque instruction, and a gear instruction may be such that instead of displacement, ON/OFF and/or a speed are graphically represented. In FIG. 14, this is represented by the speed and the speed is plotted along a vertical axis of a graph.

As described above, according to a synchronous control device of a tenth embodiment, when an operation instruction to a servo shaft being a control target is the instruction to keep rotating the motor in the one direction, this is graphically displayed by the speed or an ON/OFF state with respect to the change amount, so that an operational state of the shaft is easily understood even with the instruction to be hardly understood by the representation by the displacement and there is an effect of facilitating the adjusting and/or editing therefor.

Eleventh Embodiment

It is also possible that an axis along which time is plotted is displayed. Although a horizontal axis on a display of a graphical editing unit 400 corresponds to an angle of a master shaft, it is also possible to change an angle display to a time display or additionally represent an auxiliary axis along which time or angle is displayed.

As described above, according to a synchronous control device of an eleventh embodiment, any one or both of a change in the angle of the master shaft and time elapsed from reference time are displayed as change amount information, so that it is possible to represent not only the angle of the master shaft but also the time and there is an effect of facilitating the adjusting and/or editing for an instruction to calculate an operation timing by the time.

Twelfth Embodiment

It is also possible to turn on/off, change, and/or group displays of a servo shaft and/or a device on a program. In a graphical editing unit 400, a function to appropriately represent a position in focus is desired for facilitating the adjusting and editing therefor when the number of graphs to be represented is large. Therefore, in a twelfth embodiment, the graphical editing unit 400 realizes a function to make ON/OFF of a graphic display switchable by selecting the servo shaft and/or the device, a function to change a vertical order to be displayed of the graphs by drag-and-drop operation, a function to group a plurality of graphs, and collectively turn on/off the displays and/or change the order thereof and the like, for example.

As described above, according to a synchronous control device of the twelfth embodiment, the graphical editing unit performs at least one of turning on/off, changing, and grouping the display of at least one of the servo shaft and the arbitrary device to be controlled to display the resultant, which enables to turn on/off the display of the graph and/or change the display order, thereby appropriately representing a state of the program, and there is an effect of facilitating the adjusting and/or editing therefor.

Thirteenth Embodiment

A graphical editing unit 400 may represent a servo shaft and/or a device not by a graph but by a line. Representing by the graph makes it easier to visually understand displacement of a shaft and a device, but it has a problem that a large number thereof cannot be represented on a screen. Therefore, it is represented by the line and a state of an operation instruction and a position are distinguished by colors and/or types of the line. For example, as described in the ninth embodiment, there are a function to change the color and/or line type for each operation type, a function to change the color and/or line type for each position of the servo shaft, and a function to change the color and/or line type according to the position of the servo shaft during movement and at stopping. There also are a function to change the color and/or line type according to ON/OFF of the device and a function to change the color according to a value stored in the device.

Figure 15:
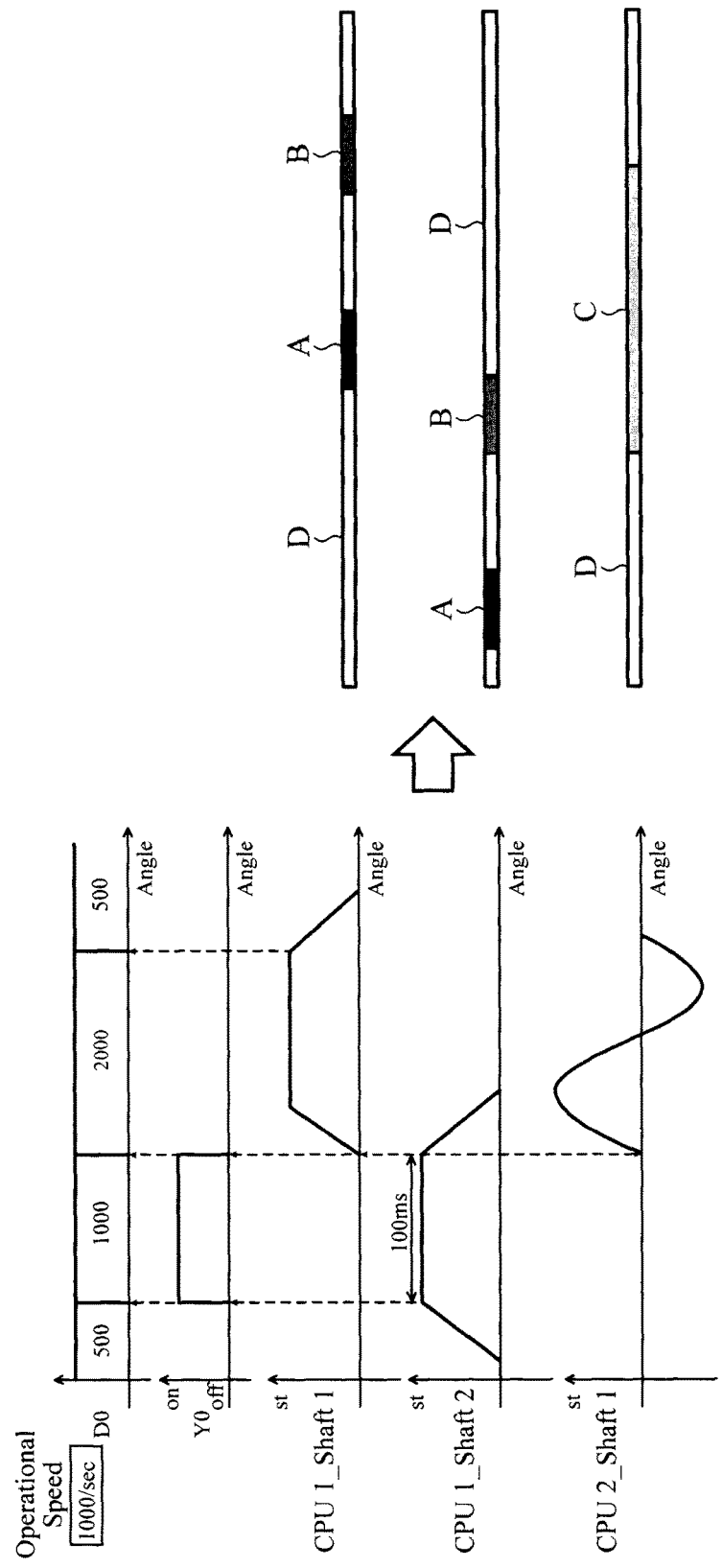
FIG. 15 is an illustrative diagram of a case of distinguishing for each instruction type in a synchronous control device of a thirteenth embodiment of the invention.

FIG. 15 illustrates a case in which it is distinguished for each instruction type and a graphic display of CPU 1_shaft 1, CPU 1_shaft 2, and CPU 2_shaft 1 in FIG. 13 are made a line display. Herein, A in the line display indicates positioning in a positive direction and is indicated in red, for example. Also, B indicates the positioning in a negative direction and indicated in blue. Furthermore, C indicates cam operation and indicated in green. D indicates a stopping state and indicated in white.

Figure 16:
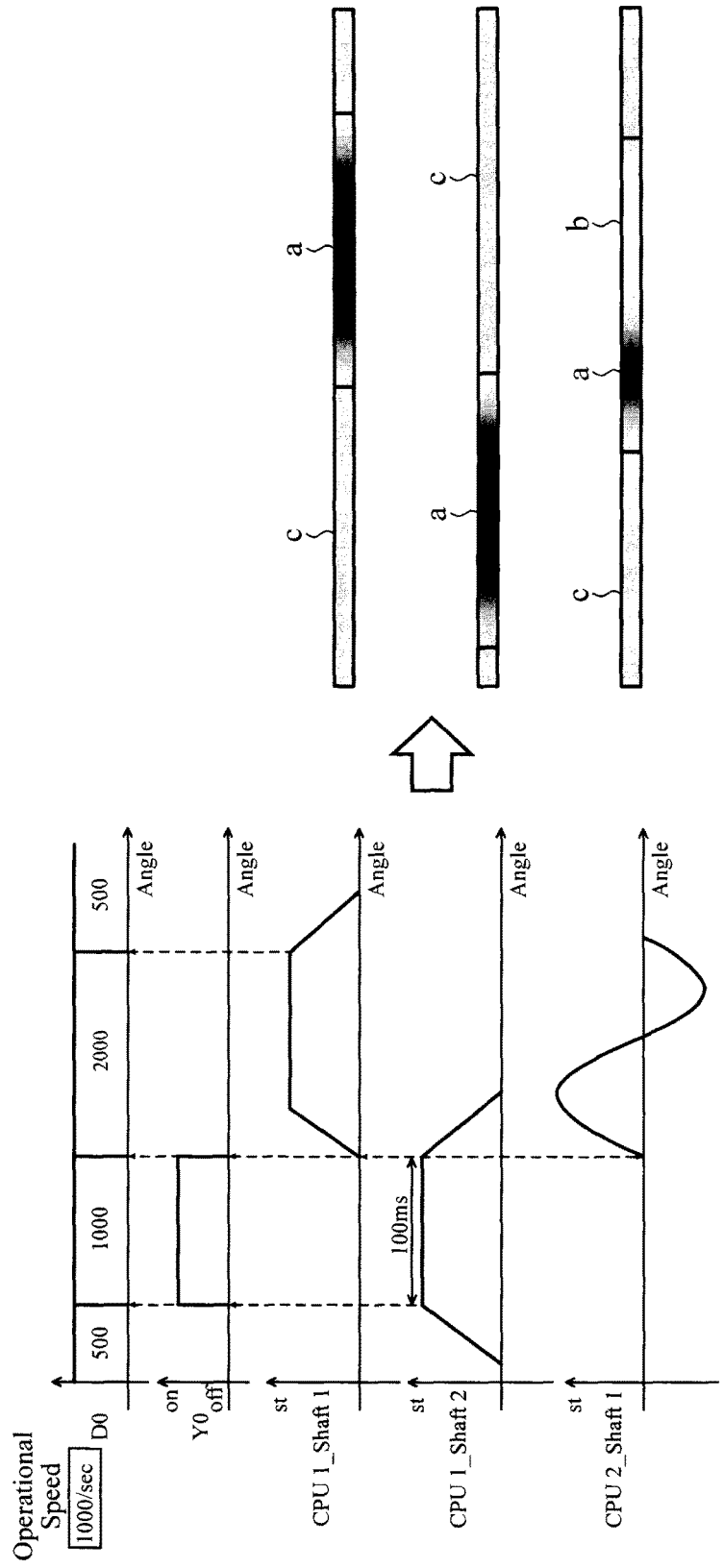
FIG. 16 is an illustrative diagram of a case of distinguishing for each position of a servo shaft in the synchronous control device of the thirteenth embodiment of the invention.

In addition, FIG. 16 illustrates a case in which it is distinguished for each position of the servo shaft similarly. The line is represented in gradation in which a, b, and c indicate the positive direction (black), the negative direction (white), and an original point position (yellow), respectively.

As described above, according to a synchronous control device of a thirteenth embodiment, the graphical display is in a line display and the display is changed according to the position of the line, so that it becomes possible to increase the number represented on the screen by representing the servo shaft and/or the device by the line and there is an effect of facilitating the adjusting and/or editing for an entire program.

Fourteenth Embodiment

Figure 17:
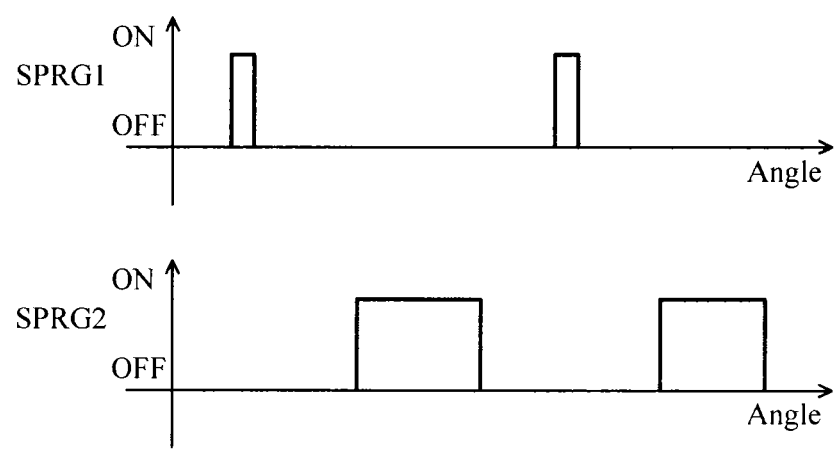
FIG. 17 is an illustrative diagram of a case in which calling of a sub program in a synchronous control device of a fourteenth embodiment of the invention is represented by a graph.

A graphical editing unit 400 may also represent calling of a sub program by a graph. This is used when an arithmetic process and/or a check of an external input signal are desired to be executed in synchronization with an angle of a master shaft and/or operation of a servo shaft. FIG. 17 illustrates an example of a graphic display. Herein, SPRG1 is an instruction to confirm an input signal, for example, and is a process of taking an input value from an external sensor at specific timing. In addition, SPRG2 is a program process to monitor a state of an internal memory for a constant period. That is to say, SPRG1 is the process executed only once and SPRG2 is the process repeatedly performed for the constant period.

These timings may be edited by the graphical editing unit 400 like an instruction of a device.

As described above, according to a synchronous control device of a fourteenth embodiment, the graphical editing unit displays the calling of the sub program with respect to the program executed by the operation instruction execution control unit, so that it is possible to graphically represent and edit execution timing of the program of the arithmetic process and there is an effect of facilitating the adjusting and/or editing therefor.

Fifteenth Embodiment

A graphical editing unit 400 may make it possible to set an input signal and/or a value of an internal memory and graphically represent an operation based on these states. An input screen on which the input signal and/or the value of the internal memory may be specified is prepared in the graphical editing unit 400, and a function to graphically represent a program executing state in an input state (for example, display illustrated in FIG. 13), and a function to enable selection of an operation instruction to be executed on a graphic screen from grouped operation instructions are added.

As described above, according to asynchronous control device of a fifteenth embodiment, the graphical editing unit accepts the input signal and a setting input to set the value of the internal memory for an operation instruction execution control unit to perform control, accepts a selection input to select the operation instruction to be executed from the grouped operation instructions, and displays a control result of the operation instruction execution control unit for the inputs, so that an operation pattern changing according to condition branching, for example, can be graphically represented, and there is an effect of facilitating the adjusting and/or editing therefor.

Sixteenth Embodiment

In a graphical editing unit 400, it is also possible to input a scenario to change an input signal and/or a value of an internal memory at a specified angle and/or time and graphically represent an operation pattern spanning a plurality of cycles along the input scenario. Herein, the scenario mimics an input from an external device and/or another control unit 100 and has the following configuration, for example.

=90 Then X0=ON External input X0 is turned ON at an angle of 90 degrees

=120 Then X0=OFF External input X0 is turned OFF at an angle of 120 degrees

Y0=ON+300 msec Then X1=ON X1 is turned ON 300 msec after output Y0 is turned ON

Y0=OFF+10 msec Then X1=OFF X1 is turned OFF 10 msec after output Y0 is turned OFF Time=0 Then D0=1000 Substitute 1000 for D0 at simulation time 0

Time=3000 msec Then D0=1500 Substitute 1500 for D0 at simulation time 3000

Time=Loop(3)+200 msec Then D0=500 Substitute 500 for D0 at simulation time 200 of third loop An operation instruction execution control unit 2 simulates along the above scenario and displays a result thereof by the graphical editing unit 400.

As described above, according to asynchronous control device of a sixteenth embodiment, the graphical editing unit is configured to input the scenario that changes at least one value of the input signal and the value of the internal memory for the operation instruction execution control unit to perform control according to a specified change amount and graphically display the simulation result of the operation instruction execution control unit operating along the input scenario, so that it is possible to confirm the simulation result of a program by displaying the operation pattern along the scenario and there is an effect of facilitating the adjusting and/or editing therefor.

Seventeenth Embodiment

It is also possible to confirm consistency of an operation timing table 4 of a servo shaft and in a case of inconsistency, a graphical editing unit 400 may represent a warning by text or on a graphical screen. That is to say, a start timing and a completion timing of an operation instruction of the servo shaft are compared with each other, without consideration of whether it is in a state in which the operation instruction can be accepted, and if there is the operation instruction already started before another operation instruction is completed, the graphical editing unit 400 displays the warning about the operation instruction to be started. Meanwhile, it is also possible that an operation instruction execution control unit 2 confirms the consistency.

As the display of the warning by the graphical editing unit 400, a section in which the operation instructions overlap is represented by text, a color and/or a line type of a line segment of the operation instruction of the corresponding section are changed, or a background color of the corresponding section is changed, for example.

As described above, according to a synchronous control device of the seventeenth embodiment, the consistency of the plurality of operation instructions is checked and the graphical editing unit generates the warning in the case of inconsistency, so that there is an effect of facilitating the adjusting and/or editing therefor by displaying the warning when there is a defect of operation timing.

Eighteenth Embodiment

Although the consistency of the operation timing table 4 is confirmed and the warning is displayed when there is the section in which the operation instructions overlap in the seventeenth embodiment, it is also possible that a graphical editing unit 400 presents operation timing to be adjusted.

Completion timing of the operation instruction which makes completion of another operation instruction operation start timing depends on the operation start timing of the operation instruction which is referred to. Therefore, when a plurality of operation instructions tangle with each other, it becomes difficult to understand the operation instruction the start timing of which should be adjusted for keeping the consistency of the operation timing table 4.

Therefore, the graphical editing unit 400 extracts the operation instruction having the section in which the operation instructions overlap and confirms the operation instruction which determines the operation start timing of the overlapping operation instruction to display the resultant. Meanwhile, it is also possible that an operation instruction execution control unit 2 confirms the consistency.

As described above, a synchronous control device of an eighteenth embodiment checks the consistency of the plurality of operation instructions and presents the operation instruction the operation timing of which should be adjusted by the graphical editing unit when there is the section in which the operation instructions overlap, so that confirming the operation instruction which determines the operation start timing of the overlapping operation instruction to display the resultant makes it easy to confirm the operation instruction of which the timing is adjusted and there is an effect of facilitating the adjusting and/or editing therefor.

Ninteenth Embodiment

Although a graphical editing unit 400 displays an operation instruction of which the timing may be adjusted in the eighteenth embodiment, it is also possible to add a function to adjust operation timing. For example, instruction completion timings of a positioning instruction and/or a time fixed instruction will delay from a viewpoint of an angle of a master shaft when an operational speed increases. Therefore, when the operational speed is made too high, consistency of an operation timing table 4 may be lost, and it becomes necessary to adjust start timing of the corresponding operation instruction.

Therefore, in a nineteenth embodiment, the graphical editing unit 400 obtains the highest operational speed and the start timing of the operation instruction which realizes the same under a condition that the consistency of the operation timing table 4 may be maintained, and presents the resultant. This may be calculated by extraction of the operation instruction which determines the completion timing of the operation instruction, extraction of a range of the operation start timing which may be adjusted, and execution time of the positioning instruction and/or the time fixed instruction.

In combination, it is also possible to input the highest speed and/or highest acceleration of a servo shaft and calculate the operational speed not higher than the highest speed and/or highest acceleration from cam data of a cam instruction to be executed, thereby presenting the highest operational speed and a cam instruction which limits the same. Meanwhile, it is also possible that an operation instruction execution control unit 2 confirms the consistency.

As described above, according to a synchronous control device of the nineteenth embodiment, when the start timing of the operation instruction of the servo shaft which the operation instruction execution control unit controls is affected by the completion timing of another operation instruction and the consistency of the operation instructions cannot be obtained, the graphical editing unit displays the highest operational speed and the start timing of the operation instruction which realizes the same within a range in which the consistency is kept, so that there is an effect of facilitating the adjusting and/or editing therefor by presenting the highest operational speed, the operation timing which realizes the same, and/or the cam instruction which limits the same from the input operation timing table.

Twentieth Embodiment

It is also possible to compare an operation pattern when an actual device is operated with a program to display on a graphical editing unit 400. In a twentieth embodiment, an operation instruction execution control unit 2 monitors a command value of a servo shaft and/or a feedback signal (signal indicating an operation status of the servo shaft such as a current position of a motor fed back from a servo amplifier 300 to a control unit 100), and a value of an internal memory when the actual device is automatically operated, to graphically represent the resultant on the graphical editing unit 400. Operations of the shaft and/or an output as a result of simulation of an operation program from the monitored value of the internal memory, an actual command value, and/or the feedback signal are arranged or superimposed to be displayed or stored in data.

As described above, according to a synchronous control device of the twentieth embodiment, the graphical editing unit displays the result of the simulation of instruction execution by the operation instruction execution control unit and the value obtained from an actual control target, so that there is an effect of facilitating the adjusting and/or editing therefor by comparing the result of the simulation of the execution of the program with the operation of the actual device to present the resultant.

Twenty-First Embodiment

It is also possible to create cam data from a positioning instruction. A graphical editing unit 400 creates the cam data which traces a trajectory that is the same as that when a servo shaft executes the positioning instruction when a master shaft operates on a specified assumed line from an assumed operational speed and a parameter of the positioning instruction. Alternatively, an angle of the master shaft at which an operation is started, the angle of the master shaft at which the operation is completed, and a stroke are specified and the cam data which forms a curve between the two points without a drastic load is created. Then, the control unit 100 executes the operation instruction as the cam control with the corresponding cam data. When the cam data is changed, for example, when the assumed operational speed is changed, the cam data is changed at the same time.

As described above, according to asynchronous control device of a twenty-first embodiment, the graphical editing unit creates the cam data from the assumed operational speed and the positioning instruction, and the operation instruction execution control unit performs execution control based on the cam data; thus, when the cam data is created such that the speed and/or acceleration are specified like the positioning instruction, and that the cam data which smoothly connects the two points is created, it becomes easy to create the cam data which sufficiently exerts performance of the servo, and there is an effect of facilitating the adjusting and/or editing therefor.

Twenty-Second Embodiment

It is also possible to set an assumed operational speed and smoothing time, or a slip amount of smoothing, and create cam data from an operation pattern when the set smoothing is executed for the selected cam data. When a stopping driven shaft is coupled to a main shaft rotating at a high speed without the smoothing, an overload is applied to an amplifier and a motor. Therefore, a graphical editing unit 400 corrects the cam data from the assumed operational speed and a smoothing parameter such that an operation instruction execution control unit 2 may perform similar control without setting and executing the smoothing in this embodiment.

As described above, according to asynchronous control device of a twenty-second embodiment, the graphical editing unit creates the cam data from the operation pattern when the set smoothing is executed at the assumed operational speed based on the assumed operational speed, the smoothing time set in advance, or the slip amount of the smoothing, and the operation instruction execution control unit performs execution control based on the cam data, so that the cam data which realizes the set smoothing is obtained, which eliminates the need to perform the smoothing when connecting to the main shaft during the operation, so that description of a program becomes easier and there is an effect of reducing a calculation load of the control.

Meanwhile, in the invention of the present application, embodiments may be freely combined, an arbitrary component of each embodiment may be modified, or an arbitrary component may be omitted in each embodiment without departing from the scope of the invention.

INDUSTRIAL APPLICABILITY

As described above, the synchronous control device according to the invention is configured to make the change in the angle of the master shaft or the time elapsed from the reference time the change amount information and control the execution of the operation instruction in synchronization with the change amount information, and it is suitable for use in an industrial machine and a manufacturing device each having a driving device, and an industrial controller that controls a manufacturing line.

DESCRIPTION OF REFERENCE NUMERALS AND SIGNS

1 CHANGE AMOUNT INFORMATION CALCULATING UNIT, 2 OPERATION INSTRUCTION EXECUTION

CONTROL UNIT, 3 OPERATION INSTRUCTION EXECUTING UNIT, 4 OPERATION TIMING TABLE, 100 CONTROL UNIT, 200 MASTER ENCODER, 300 SERVO AMPLIFIER, 400 GRAPHICAL EDITING UNIT.

The invention claimed is:

1. A synchronous control device that makes a change in an angle of a master shaft or time elapsed from reference time change amount information and controls execution of an operation instruction of a slave shaft in synchronization with the change amount information, the synchronous control device comprising as a controller:
a change amount information calculator that calculates the change amount information;
an operation instruction execution controller that, when a start condition indicating an angle condition of the master shaft or a time condition from the reference time and a predetermined signal condition are defined for the operation instruction of the slave shaft and when the change amount information satisfies the start condition and the signal condition is true, determines a start of a corresponding operation instruction, and determines operation completion based on a completion condition determined in advance of the operation instruction; and
an operation instruction executor that executes the operation instruction the start of which is determined by the operation instruction execution controller and stops the operation instruction when the operation completion is determined by the operation instruction execution controller.

2. The synchronous control device according to claim 1, comprising:
an operation timing table in which the start conditions and operation instructions of one round of the master shaft or one period from the reference time are arranged in an order of execution, wherein
the operation instruction execution controller shifts to determination of the operation instruction to be executed next when any operation instruction is executed or when the change amount information passes a value of the start condition, and shifts to the determination of a first operation instruction in the order of execution of the operation timing table when passing of a last operation instruction in the order of execution of the timing table.

3. The synchronous control device according to claim 2, wherein arbitrary operation instructions are grouped, and when any operation instruction in the group satisfies a condition, the operation instruction execution controller determines the start of the operation instruction which satisfies the condition.

4. The synchronous control device according to claim 2, wherein the operation timing table includes a change in an output device being a target of synchronous control or a value of an internal memory being a value used when the synchronous control is executed.

5. The synchronous control device according to claim 4, wherein a change instruction of the output device or the value of the internal memory is held in one operation timing table.

6. The synchronous control device according to claim 1, comprising: a plurality of controllers, wherein when an arbitrary controller makes completion of the operation instruction of a specific controller different from the arbitrary controller the signal condition of the arbitrary controller, the specific controller calculates completion timing of the operation instruction, and also the arbitrary controller determines the start of the operation instruction of the arbitrary controller based on the completion timing of the operation instruction in the specific controller.

7. The synchronous control device according to claim 1, wherein the operation instruction is an instruction not having the completion condition and stopped by another operation instruction in place of the operation instruction according to claim 1.

8. The synchronous control device according to claim 1, comprising, as the predetermined signal condition, at least one of an input signal from a device represented by two values of ON and OFF, the input signal from the device capable of handling a numerical value or a character string, and the input signal from the device capable of handling a timer, and the input signal from an external input device.

9. A synchronous control device that makes a change in an angle of a master shaft or time elapsed from reference time change amount information and controls execution of an operation instruction in synchronization with the change amount information, the synchronous control device comprising:
an operation instruction execution controller that checks the change amount information and a predetermined signal value of its own holding against an instruction execution condition provided corresponding to the operation instruction or a change execution condition of a value of an internal memory indicating a value of an arbitrary device used in control, and controls to execute the operation instruction or the change in the value of the internal memory when the change amount information and the predetermined signal value satisfy the instruction execution condition or the change execution condition; and
a graphical editor that graphically displays an execution control state of the operation instruction execution controller and accepts an edit input of the operation instruction or the change in the value of the internal memory to displayed contents.

10. The synchronous control device according to claim 9 that, when the operation instruction to a servo shaft being a control target is an instruction to keep rotating a motor in one direction, graphical display is performed by a speed or an ON/OFF state with respect to a change amount.

11. The synchronous control device according to claim 9, wherein any one or both of the change in the angle of the master shaft and the time elapsed from the reference time are displayed as the change amount information.

12. The synchronous control device according to claim 9, wherein the graphical editor performs at least one of turning on/off, changing, and grouping of displays of at least one of a servo shaft and an arbitrary device being a control target to display the resultant.

13. The synchronous control device according to claim 9, wherein the graphical editor accepts a setting input to set an input signal and a value of an internal memory for the operation instruction execution controller to perform control, accepts a selection input to select the operation instruction to be executed from grouped operation instructions, and displays a control result of the operation instruction execution controller to the inputs.

14. The synchronous control device according to claim 9, wherein the graphical editor inputs a scenario which changes at least one value of an input signal and the value of the internal memory for the operation instruction execution controller to perform control according to a specified change amount and graphically displays a simulation result of the operation instruction execution controller that operates along the input scenario.

15. The synchronous control device according to claim 9, wherein consistency of a plurality of operation instructions is checked and in a case of inconsistency, a warning by the graphical editor is generated.

16. The synchronous control device according to claim 9, wherein consistency of a plurality or operation instructions is checked, and when there is a section in which any operation instruction overlaps, the operation instruction the operation timing of which is to be adjusted is presented by the graphical editor.

17. The synchronous control device according to claim 9, wherein, when start timing of the operation instruction of a servo shaft which is a control target of the operation instruction execution controller is affected by completion timing of another operation instruction and consistency of the operation instructions is not obtained, the graphical editor displays the highest operational speed and the start timing of the operation instruction to realize the highest operational speed within a range in which the consistency is obtained.

18. The synchronous control device according to claim 9, wherein the graphical editor displays a result of simulation of instruction execution by the operation instruction execution controller and a value obtained from an actual control target.

19. The synchronous control device according to claim 9, wherein the graphical editor creates cam data from an assumed operational speed and a positioning instruction, and the operation instruction execution controller performs execution control based on the cam data.

20. The synchronous control device according to claim 9, wherein the graphical editor creates, based on an assumed operational speed, smoothing time set in advance, or a slip amount of smoothing, cam data from an operation pattern when the set smoothing is executed at the operational speed, and the operation instruction execution controller performs execution control based on the cam data.

* * * * *